United States Patent [19]

Sziklai

[11] 4,151,591
[45] Apr. 24, 1979

[54] TRANSVERSE TRACK MAGNETIC TRANSDUCING HEADS

[76] Inventor: George C. Sziklai, 26900 St. Francis Rd., Los Altos Hills, Calif. 94022

[21] Appl. No.: 868,809

[22] Filed: Jan. 12, 1978

[51] Int. Cl.² ............................................. G11B 5/12
[52] U.S. Cl. .................................... 360/115; 360/125
[58] Field of Search ................. 360/115, 119, 121–126

[56] References Cited

U.S. PATENT DOCUMENTS

| | | | |
|---|---|---|---|
| 3,012,233 | 12/1961 | Greanias et al. | 360/125 X |
| 3,218,398 | 11/1965 | Wiley | 360/125 |
| 3,369,083 | 2/1968 | Clapper et al. | 360/125 X |
| 3,419,688 | 12/1968 | Hollingsworth | 360/122 X |

FOREIGN PATENT DOCUMENTS 148546 10/1961 U.S.S.R. ................................. 360/125

*Primary Examiner*—John H. Wolff

[57] ABSTRACT

Magnetic transducing heads are disclosed which include two stacks of ferromagnetic laminations. Each lamination in one stack is paired with a lamination in the other stack. At their closest point each pair of laminations defines a transducing gap. The stacks are so positioned that the transducing gaps form a linear array. The tops of the two stacks of laminations are so configured as to lie in a common cylindrical surface, the axis of the common cylindrical surface being perpendicular to the rectilinear array of transducing gaps, though not intersecting it. A cylindrical rotor is rotatably mounted so that its surface is very close to the cylindrical top surfaces of the two stacks. Four low reluctance bridging elements are mounted in the rotor and at or near its cylindrical surface. An exciting winding surrounds one stack of laminations. The method of the invention is carried out by rotating the rotor in synchronism with the movement of magnetic recording tape past the linear array of transducing gaps while passing recording current through the exciting winding, thus repeatedly positioning low reluctance bridging members across successive ones of the gaps between the tops of pairs of laminations in the same order, thereby repeatedly "switching on" the recording flux in successive ones of the transducing gaps in the same order.

5 Claims, 6 Drawing Figures

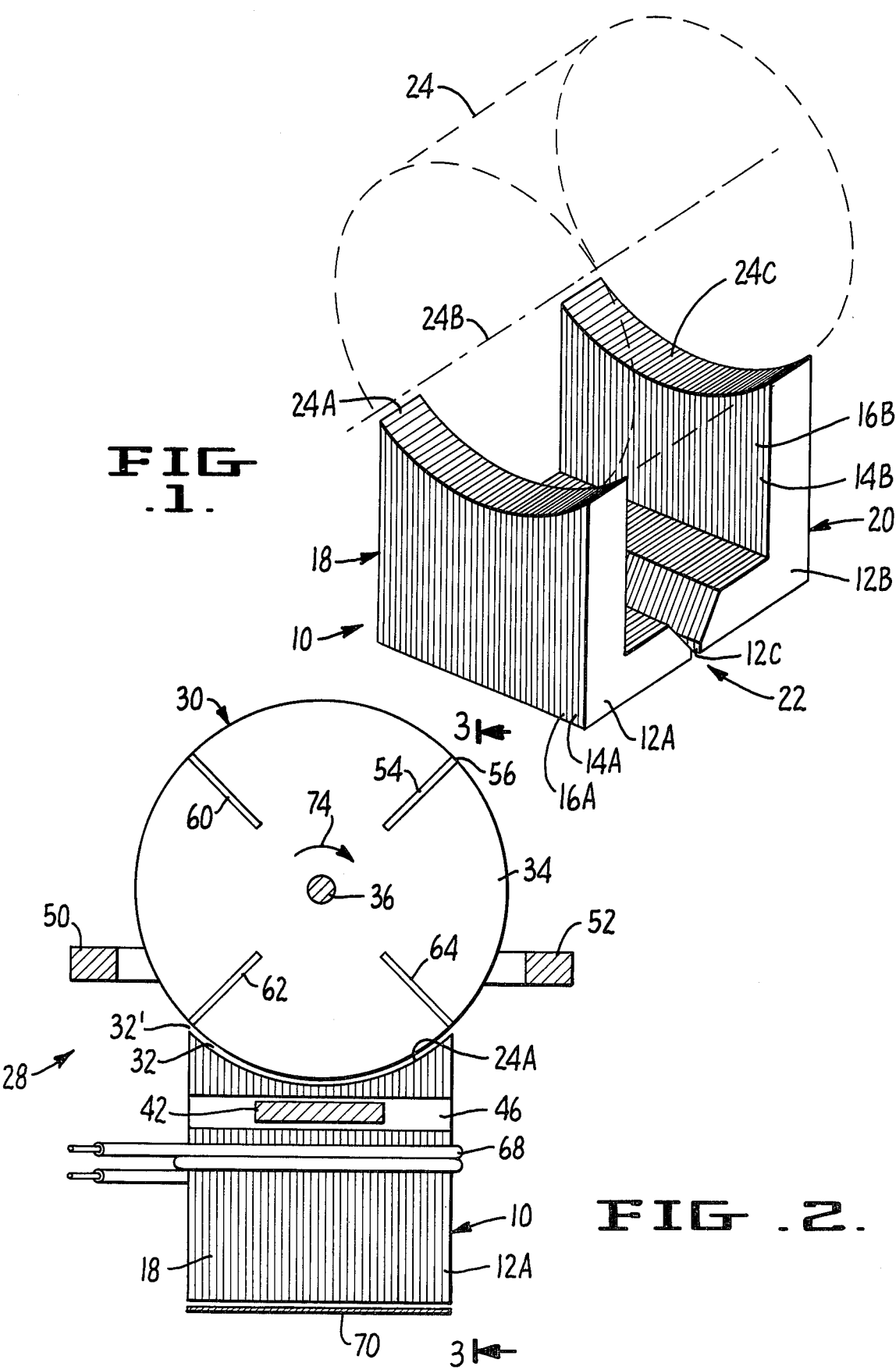

TRANSVERSE TRACK MAGNETIC TRANSDUCING HEADS

BACKGROUND OF THE INVENTION

1. Field of the Invention

The present invention relates to methods and apparatus for high density magnetic tape recording and playback, and more particularly to methods and apparatus for high density magnetic tape recording and playback by means of a plurality of pairs of ferromagnetic laminations, each pair together defining a transducing gap and a larger gap, in which said larger gaps are successively scanned by one or more low reluctance bridging members, and thus fringing fluxes corresponding to successive elements of a video signal are produced in successive ones of said transducing gaps.

2. Description of the Prior Art

Methods and apparatus for high density video magnetic recording and playback are known in the prior art. For instance, it has been proposed to record video signals laterally rather than longitudinally of magnetic recording tape (see U.S. Pat. No. 2,517,808, issued to George C. Sziklai on Aug. 8, 1950). Such methods and apparatus have taken many forms, such as transducing heads rotating laterally, helically, etc., in relation to the longitudinal axis of the magnetic recording tape. In each of these cases, however, a high relative speed between the transducing head or heads and the magnetic recording tape is required, and this high relative speed causes excessive wear both of the tape and the transducing head. In particular, such head wear occurs in the area of the head gap, thus reducing the resolution of the recording and playback system. A high speed video tape recording system has been proposed in which a rotating bridging member bridges successive gaps in a corresponding plurality of magnetic circuits, each containing one transducing gap of a linear array of transducing gaps, whereby to transversely scan an associated magnetic recording tape and record thereupon, or read therefrom, successive signals corresponding to successive elements of a video signal (see U.S. Pat. No. 3,236,942). However, the minimum cross-sectional area of each of the several magnetic circuits of this prior art device is so small as to seriously limit the intensity of the dipoles which can be recorded upon the magnetic tape. Also, in this prior art device the magnetic recording tape must intersect all of said magnetic circuits, making recording from one side of the tape in accordance with the conventional practice impossible.

SUMMARY OF THE INVENTION

Accordingly, it is an object of the present invention to provide methods and apparatus for high density magnetic recording and playback wherein tape wear and head wear are substantially reduced, by utilizing a stationary, laminated transducing head assembly.

Another object of the present invention is to provide methods and apparatus for high density magnetic recording and playback in which a plurality of magnetic circuits containing recording gaps are successively closed by mechanically moved low reluctance bridging means, and in which at the same time recording is done from one side of the tape only.

A further object of the present invention is to provide methods and apparatus for high density magnetic recording and playback by reluctance scanning in which the effects of cross-talk between adjacent magnetic circuits is reduced.

Other objects of the present invention will in part be obvious and will in part appear hereinafter.

The present invention, accordingly, comprises the several steps and the relation of one or more such steps with respect to each of the others, and the apparatus embodying features of construction, combinations of elements, and arrangements of parts which are adapted to effect such steps, all as exemplified in the following disclosure, and the scope of the present invention will be indicated in the appended claims.

In accordance with a principal feature of the present invention magnetic transducing heads are disclosed which comprise two cooperating stacks of ferromagnetic laminations, each lamination in one stack being paired with a lamination in the other stack to define a transducing gap and a larger gap.

In accordance with another principal feature of the present invention said transducing gaps are disposed in a rectilinear array, and the associated magnetic recording tape is moved past said array of transducing gaps, closely adjacent thereto, said array being disposed substantially transverse to the major longitudinal dimension of the magnetic recording tape.

In accordance with yet another principal feature of the present inventin said larger gaps lie in a common cylindrical surface, and a rotor is provided whereby one or more low reluctance bridging elements are moved repeatedly in the same direction past successive ones of said larger gaps, whereby to make if possible for current in an exciting coil linked with all of said magnetic circuits to produce recording fringing flux in successive ones of said transducing gaps.

For a fuller understanding of the nature and objects of the present invention, reference should be had to the following detailed description, taken in connection with the accompanying drawings.

BRIEF DESCRIPTION OF THE DRAWINGS

FIG. 1 is a perspective view of the laminated pole structure of a magnetic transducing head embodying the present invention;

FIG. 2 is a vertical sectional view of a magnetic transducing head embodying the present invention taken on line 2—2 of FIG. 3;

DESCRIPTION OF THE PREFERRED EMBODIMENTS

Figure 3:
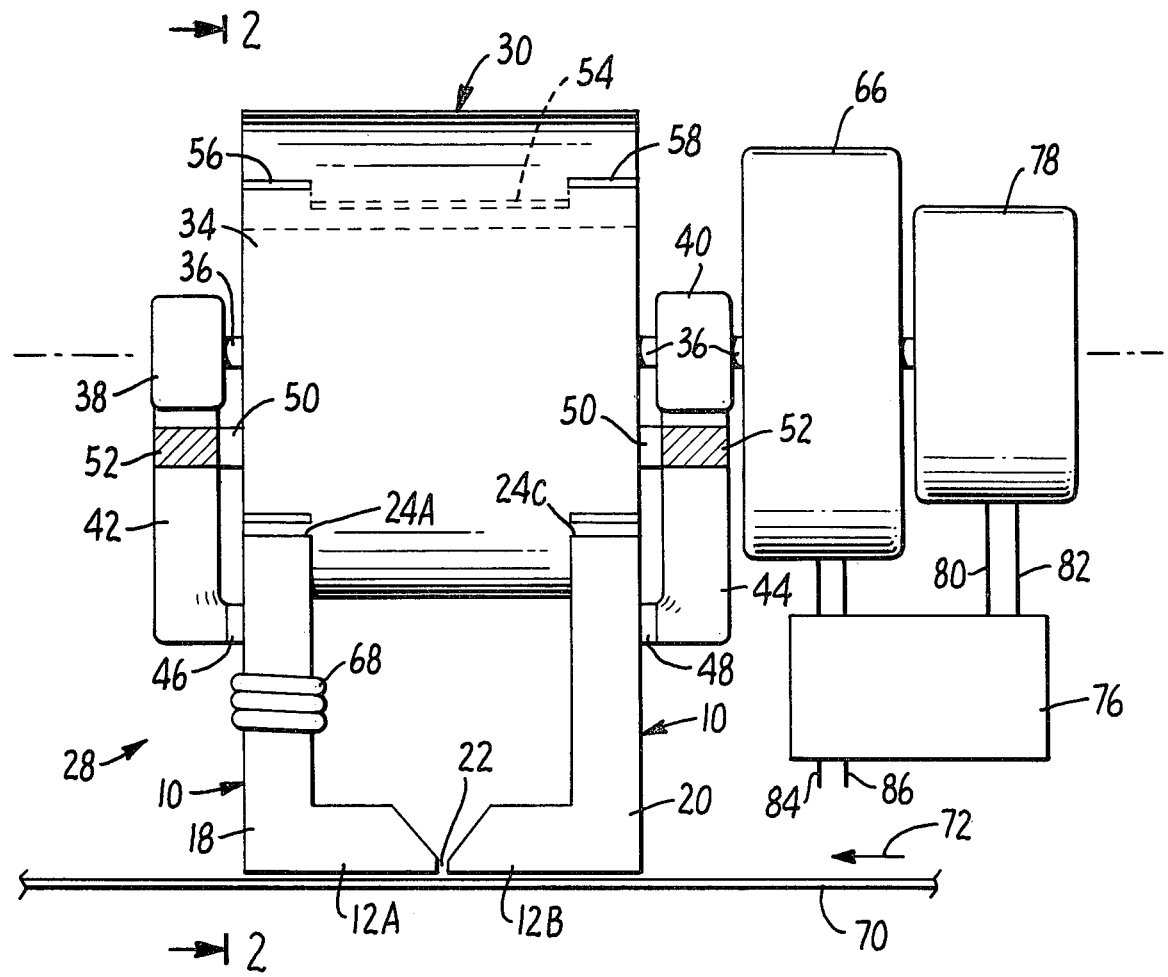
FIG. 3 is a vertical sectional view of a magnetic transducing head embodying the present invention taken on line 3—3 of FIG. 2.

Referring now to FIG. 1, there is shown the pole structure 10 of a magnetic transducing head embodying the present invention. Pole structure 10 consists of a plurality of pairs 12, 14, 16, etc., of ferromagnetic laminations. As best seen in FIG. 1, lamination pair 12 consists of a first lamination 12A and second lamination 12B; lamination pair 14 consists of a first lamination 14A and a second lamination 14B; lamination pair 16 consists of a first lamination 16A and a second lamination 16B; etc. By way of example only, the laminations of pole structure 10 may be 0.004 inches thick.

The lamination of pole structure 10 are maintained in the juxtaposition shown in FIG. 1 by conventional means (not shown) which are not part to the present invention.

Each pair of laminations shown in FIG. 1 defines, at the point of closest spacing between the laminations of the pair, a transducing gap. Thus, the laminations 12A and 12B of FIG. 1 define between the adjacent ends of their lower edges a transducing gap 12C. Similarly, the laminations 14A and 14B define between adjacent ends of their lower edges, as seen in FIG. 1, a transducing gap 14C; the laminations 16A and 16B define between the adjacent ends of their lower edges, as seen in FIG. 1, a transducing gap 16C; etc.

It will thus be understood by those having ordinary skill in the art, informed by the present disclosure, that the two stacks of laminations making up the pole structure 10 of FIG. 1 define between them a rectilinear array of closely juxtaposed transducing gaps 12C, 14C, 16C, etc.; the number of transducing gaps in said rectilinear array being equal to the number of pairs of laminations.

For clarity of description, the frontmost stack of laminations shown in FIG. 1, i.e., 12A, 14A, 16A, etc., will be designated by the reference numeral 18 herein; and the rearmost stack of laminations shown in FIG. 1, i.e., 12B, 14B, 16B, etc., will be designated by the reference numeral 20 herein. When, for example, it is desired to record on quarter inch magnetic tape, each stack 18, 20 will typically comprise 60 laminations.

Further, the rectilinear array of transducing gaps 12C, 14C, 16C, etc., described hereinabove, will sometime be referred to herein by the reference numeral 22.

As further shown in FIG. 1, the upper ends of all of the "A" laminations, i.e., the laminations of stack 18, are so located and configured as to lie in a common cylindrical surface 24. The cylindrical upper surface of lamination stack 18, i.e., the upper surfaces of the "A" laminations taken collectively, will sometimes be designated herein by the reference numeral 24A. The axis of the common cylindrical surface 24 will be designated herein by the reference numeral 24B.

As also shown in FIG. 1, the upper ends of all of the "B" laminations, i.e., the laminations of stack 20, are so located and configured as to lie in said common cylindrical surface 24. The cylindrical upper surface of lamination stack 20, i.e., the upper surfaces of the "B" laminations taken collectively, will sometimes be designated herein by the reference numeral 24C.

Referring now to FIGS. 2 and 3, there is shown a magnetic transducing head 28 constructed in accordance with a first preferred embodiment of the present invention. Magnetic transducing head 28 comprises a pole structure 10 of the kind shown in FIG. 1 and described hereinabove. The parts of a pole structure 10 are referred to throughout the present specification by the same reference numerals used to designate those parts in FIG. 1. Thus, it will be seen that the rightmost lamination shown in FIG. 2 is lamination 12A of FIG. 1; the only stack of laminations shown in FIG. 2 is stack 18 of FIG. 1; etc. Similarly, while both of the stacks of laminations 18, 20 of the magnetic transducing head 10 of FIG. 1 are shown in FIG. 3, only two laminations are shown, viz., 12A and 12B, one from each stack.

As may be seen by comparisons of FIGS. 2 ad 3, a cylindrical rotor 30 is positioned above pole structure 10 in such manner that the cylindrical surface of rotor 30 is uniformly spaced from the cylindrical upper surface 24A of lamination stack 18, and from the cylindrical upper surface 24C of lamination stack 20, respectively, by very small gaps 32 and 32' (FIG. 2).

The main body 34 of rotor 30 is formed from non-magnetic material. Main body 34 is irrotatably affixed to a shaft 36 for conjoint rotation therewith. Shaft 36 is journalled in a pair of bearings 38, 40 (FIG. 3) so that shaft 36 is coaxial with the common cylindrical surface 24 (FIG. 1) in which said cylindrical upper surfaces 24A and 24B lie, whereby the width of said gaps 32, 32' is maintained.

As may also be seen from FIG. 3, bearings 38 and 40 are fixedly positioned with respect to pole structure 10 by means of arms 42, 44, which are themselves affixed to pole structure 10 by means of mounting pads 46, 48. Arms 42 and 44 are joined together for additional rigidity by means of side frame members 50, 52. Arms 40, 42, side frame members 50, 52, and mounting pads 46, 48 in particular, will preferably be formed from non-magnetic material. Mounting pads 46 and 48 are affixed to lamination stacks 18 and 20, respectively, by means well-known to those having ordinary skill in the art.

Figure 4:
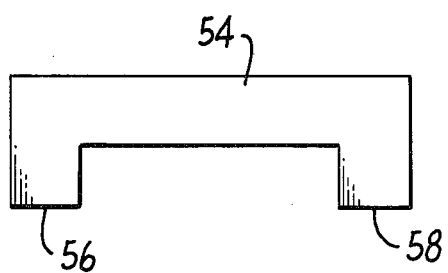
FIG. 4 illustrates one of the low reluctance bridging members of the embodiment of the present invention illustrated in FIGS. 2 and 3.

As may also be seen by comparison of FIGS. 2 and 3, a low reluctance bridging member 54 (FIG. 4) is mounted in rotor 30. Bridging member 54 is so disposed in rotor 30 that it lies in a plane containing the axis of shaft 36, and that the outer ends 56, 58 (FIG. 4) of the two ears projecting from its main body portion are flush with the cylindrical surface of rotor 30.

As best seen in FIG. 2, three other low reluctance bridging members 60, 62, 64 are also mounted in rotor 30 and the four bridging members 54, 60, 62 and 64 are also mounted in rotor 30, and the four bridging members 54, 60, 62, 64 are equiangularly disposed about the axis of shaft 36. Bridging members 60, 62, 64 are substantially ientical to bridging member 54. All of the bridging members 60, 62, 64 are so disposed in rotor 30 as to contain a plane which itself contains the axis of shaft 36. Each of the bridging members 60, 62, 64 has a pair of tips or edge portions corresponding to tips or edge portions 56, 58 of bridging member 54, and the tips or edge portions of each bridging member 60, 62, 64 are flush with the cylindrical surface of rotor 30.

As best seen in FIG. 2, each of the bridging members 54, 60, 62, 64 is substantially equal in thickness to the ferromagnetic laminations 12A, 14A, 16A, etc., 12B, 14B, 16B, etc., of pole structure 10.

Thus, it will be seen that when rotor 30 is rotated, as by a motor 66 (FIG. 3), each bridging member is swept past the lamination pairs 12, 14, 16, etc., in succession, momentarily bridging the gap between the upper ends of the two laminations of each successive pair. Thus, bridging member 54 magnetically bridges the upper ends of each pair of laminations in pole structure 10 during the rotation of rotor 30 through 90 degrees, bridging member 60 then successively bridges the upper ends of each pair of laminations in pole structure 10 during the next 90 degress of rotation of rotor 30, etc.

It follows, then, that in the magnetic transducing head of FIGS. 2 and 3 the gaps between the upper ends of the pairs of laminations 12, 14, 16 etc., are successively bridged, in the same order, four times during each rotation of rotor 30.

Again comparing FIGS. 2 and 3, it will be seen that an exciting winding 68 surrounds all of the laminations of stack 18. Thus, it will be understood that when an exciting current, modulated for magnetic recording in the well-known manner, is passed through exciting winding 68, recording fringing flux will be produced in the transducing gap 12C if and only if the upper ends of laminations 12A and 12B are at that time bridged by one of the bridging members 54, 60, 62, 64. Similarly, exciting current in exciting winding 68 will induce recording fringing flux in transducing gap 14C if and only if one of the bridging members is bridging the upper ends of laminations 14A and 14B; exciting current in exciting winding 68 will induce recording fringing flux in transducing gap 16C if and only if one of the bridging members is bridging the gap between the upper ends of laminations 16A and 16B; etc.

Again comparing FIGS. 2 and 3 it will be seen that, in accordance with the principles of the present invention, a magnetic recording tape 70 is moved past magnetic transducing head 28 in the direction shown by arrow 72 (FIG. 3), the transverse dimension of tape 70 being maintained in registration with pole structure 10. Thus, it will be seen that during the motion of tape 70 past magnetic transducing head 30 to abovesaid rectilinear array 22 of transducing gaps is maintained transverse to magnetic recording tape 70, and extends substantially from edge to edge of magnetic tape 70.

It follows that if the speed of rotation of rotor 30 in the direction indicated by arrow 74 (FIG. 2) is synchronized with the rate of movement of recording tape 70 past rectilinear array 22 a signal applied to exciting winding 68 by way of current modulated in known manner for magnetic recording will be digitally recorded upon magnetic recording tape 70 in the form of successive linear arrays of magnetic dipoles, sometimes called "tracks", corresponding in strength to the mean amplitude of successive increments of the signal to be recorded. As will also be evident to those having ordinary skill in the art, informed by the present disclosure, these successive, closely spaced linear arrays of magnetic dipoles recorded on recording tape 70 will be substantially perpendicular to the edges of tape 70, i.e., make a very small angle therewith, when the speed of rotation of rotor 30 is high and at the same time the rate of advance of recording tape 70 is relatively low.

The provision of means for synchronizing the speed of advance of recording tape 70 with the speed of rotation of rotor 30 being well within the scope of those having ordinary skill in the art, such synchronizing means are not disclosed in detail herein. As an example only, direct current motor 66 may be synchronized with the operation of the tape transport mechanism (not shown) by means of a Motorola MC3302 Quad Comparator integrated circuit, designed to control small direct current motors by pulse width modulation, as shown and described in Motorola Application Note AN705; which comparator, referred to herein by the reference numeral 76, is supplied with error feedback signals by a suitable photoelectric shaft position encoder 78 over signal lines 80, 82; shaft position encoder 78 being irrotatably affixed to shaft 36 for conjoint rotation therewith. Comparator 76 will also be supplied with synchronizing signals for the tape transport mechanism by means of signal lines 84 and 86.

Alternatively, the synchronization of the rate of movement of recording tape 70 past magnetic transducing head 28 with the speed of rotation of rotor 30 may be accomplished by purely mechanical gearing means such as can be supplied by those having ordinary skill in the art without the exercise of invention.

Typically, in using the magnetic recording head of the present invention to record standard television signals on standard 2 inch recording tape the speed of movement of recording tape 70 past transducing head 28 may be 2 inches per second; in which case the speed of rotation of rotor 30 will be so selected as to record each raster line in 4 or 5 of said linear arrays of magnetic dipoles (or tracks) on recording tape 70.

Figure 5:
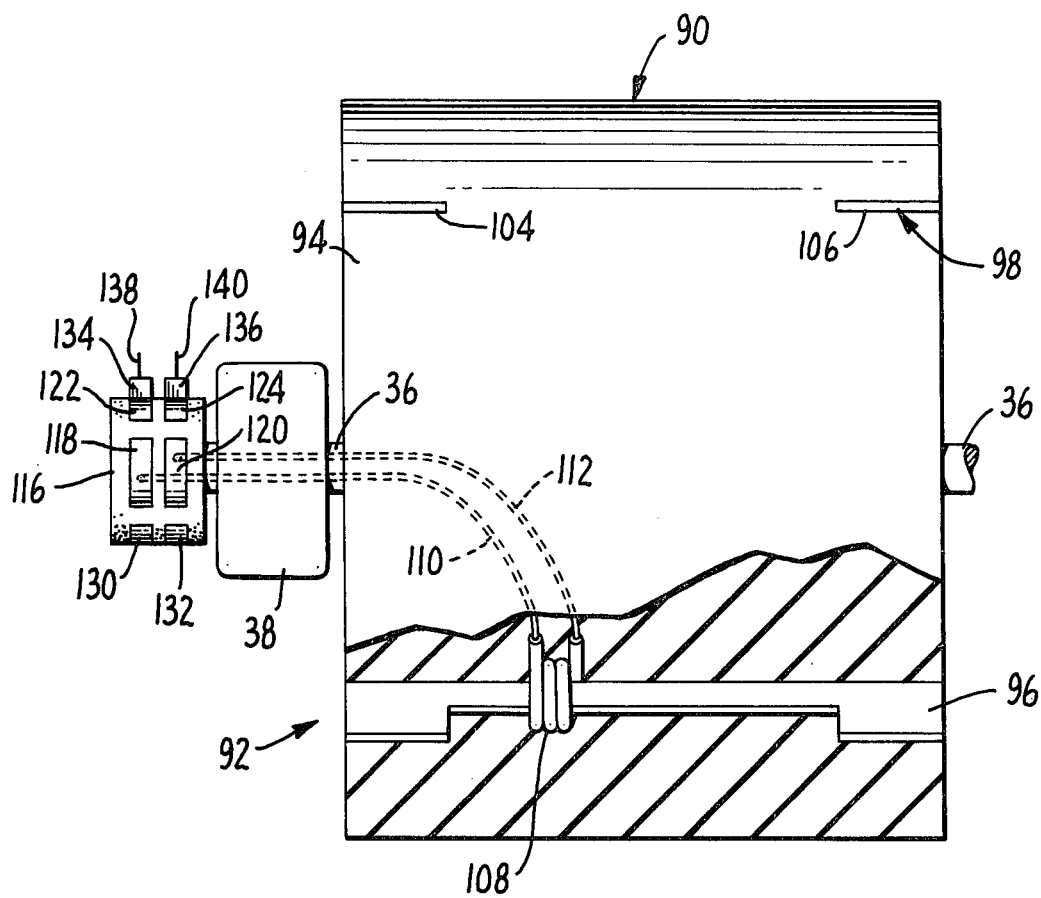
FIG. 5 is a partial sectional view of the rotor of the magnetic transducing head of a second embodiment of the present invention.

Referring now to FIG. 5, there is shown an alternative mode of providing various degrees of magnetization of lamination pairs 12, 14, 16, etc., whereby to successively produce fringing fluxes of different intensities at recording gaps 12C, 14C, 16C, etc., and thus to successively produce corresponding dipoles in magnetic recording tape 70 in the abovesaid linear arrays or tracks.

In accordance with this first alternative mode of recording flux production, which is employed in at least two preferred embodiments of the present invention, exciting winding 68 is eliminated from the embodiment of FIGS. 2 and 3 and rotor 30 of FIGS. 2 and 3 is replaced by rotor 90, as shown in FIG. 5. With these exceptions, i.e., the elimination of exciting winding 68 and the replacement of rotor 30 with rotor 90, the parts of the magnetic transducing head 92 of the now to be described second preferred embodiment are substantially identical with the corresponding parts of the transducing head 28 of the first preferred embodiment (FIGS. 2 and 3), and all such like parts, as between the first preferred embodiment and the second preferred embodiment, will be referred to by the same reference numerals. Thus, the pole structure of the second preferred embodiment is substantially identical to the pole structure 10 of the first preferred embodiment (FIGS. 2 and 3), and will also be referred to by the reference numeral 10. Similarly, the rotor shaft of the second preferred embodiment is substantially identical to the rotor shaft 36 of the first preferred embodiment, and will also be designated by the reference numeral 36.

Referring particularly now to FIG. 5, it will be seen that rotor 90 comprises a cylindrical body 94 of insulating material. Rotor body 94 may be formed from the same insulating material as rotor body 34 of the first preferred embodiment, and will be of the same dimensions as rotor body 34.

Mounted in rotor body 94 are four low reluctance bridging members 96, 98, 100, 102 (only two shown). Bridging members 96, 98, 100, 102 are substantially identical to bridging member 54 of FIG. 4, and are equiangularly spaced about the axis of rotor 94 in the same manner in which bridging members 54, 60, 62, 64 are equiangularly spaced about the axis of rotor 30 of the first preferred embodiment. Similarly, the tips of bridging members 96, 98, 100, 102 are flush with the cylindrical surface of rotor 90, as the tips of bridging members 54, 60, 62, 64 are flush with the cylindrical surface of rotor 30. Thus, the tips 104, 106 of bridging member 98 can be seen in FIG. 5 to be flush with the surface of rotor 90.

Referring now to the lower portion of rotor 90 as shown in FIG. 5, in which a portion of rotor 90 is broken away to reveal bridging member 96, it will be seen that the narrow central portion of bridging member 96 is surrounded by a coil 108 of insulation-covered wire.

As also there seen, coil 108 is provided with two leads 110, 112.

It is to be understood that in said second preferred embodiment each one of the other three equiangularly disposed bridging members 98, 100, 102 is provided with a winding corresponding to winding 108, and that each of these windings is provided with a pair of leads corresponding to leads 110 and 112.

As also seen in FIG. 5, the leads 110, 112 of winding 108 pass along shaft 36 and through bearing 38. Similarly, each pair of leads associated with one of the windings surrounding the narrow portion of one of the other bridging members 98, 100, 102 passes out of rotor 90, along shaft 36, and through bearing 38.

Affixed to the outer end of shaft 36 for conjoint rotation with rotor 90 is a commutating drum 116. Commutating drum 116 is formed from insulating material and bears on its face a plurality of conducting segments 118, 120, 122, 124, 126, 128, 130, 132, segments 126 and 128 are not being shown in FIG. 5. As seen in FIG. 5, leads 110 and 112 are connected, respectively, to segments 118 and 120 on the face of commutator drum 116. Similarly, the leads of the winding surrounding the narrow central portion of bridging member 98 are connected to conductive segments 122, 124 of commutator drum 116; the leads of the coil surrounding the narrow central portion of bridging member 100 are connected to the conductive segments 126 and 138 of commutator drum 116; etc.

As also shown in FIG. 5, a pair of brushes 134, 136, of well-known type, coact with commutator drum 116 in the well-known manner, brush 134 successively contacting segments 118, 122, etc., as shaft 36 rotates, and brush 136 successively contacting segments 120, 124, etc., as shaft 36 rotates. Brushes 134 and 136 are provided with leads 138 and 140, respectively.

As will now be evident to those having ordinary skill in the art, informed by the present disclosure, the commutation arrangement comprising commutator drum 116, brushes 134 and 136, etc., serves to pass a recording current from the recording current source connected to leads 138 and 140 to only one at a time of the windings 108, etc., surrounding the bridging members 96, 98, 100, 102, respectively, and to thus direct the recording current only to the one of these windings whose associated bridging member is scanning the lamination pairs 12, 14, 16, etc., of pole structure 10. Thus, it will be seen that these windings subserve the same function as winding 68 of the preferred embodiment.

Figure 6:
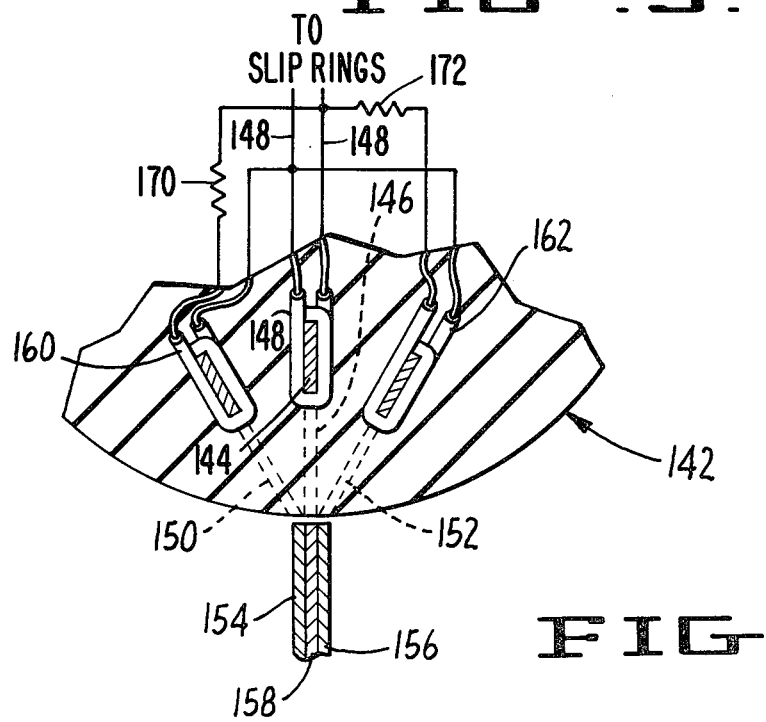
FIG. 6 is a fragmentary view in section of the rotor of the magnetic transducing head of a third embodiment of the present invention.

Going now to FIG. 6, there is shown in part only a rotor 142 which is generally similar to rotor 90 of FIG. 5 but incorporates an additional feature of the present invention whereby the effect of crosstalk between adjacent ones of the lamination pairs of pole structure 10 is substantially reduced.

In rotor 142, as seen in FIG. 6, the central bridging member 144 is substantially identical in structure and function to bridging member 96 of rotor 90, and winding 148 is substantially identical in structure and function to winding 108 of rotor 90.

According to this additional feature of the present invention, a pair of additional bridging members 150, 152 are mounted in rotor 142 at the angle shown in FIG. 6, the tips of bridging members 150 and 152 lying very closely adjacent the tips of bridging member 144 and in the cylindrical surface of rotor 142.

As also seen in FIG. 6, the tips of bridging members 150 and 152 register with the pole structure laminations 154 and 156, which themselves lie on opposite sides of the pole structure lamination 158 shown in registration with bridging member 144.

As also seen in FIG. 6, auxiliary lamination 150 is provided with a winding 160 and auxiliary lamination 152 is provided with a winding 162. In accordance with this additional feature of the present invention, the crosstalk compensating windings 160 and 162 are wound or connected to winding 148 in such manner as to buck the effect of crosstalk from adjacent signal elements on the recording tape. This bucking effect may be compensated by proper shunting of windings 160 and 162, if those windings are connected in series, or may be adjusted by the interposition of series resistors 170, 172 if windings 160 and 162 are connected in parallel. Alternatively, the bucking effect may be adjusted by the proportioning of the number of turns in recording current winding 148 as against the numbers of turns in crosstalk compensating windings 160 and 162.

As will be evident to those having ordinary skill in the art, informed by the present disclosure, each of the other three bridging members of rotor 142 will be provided with additional bridging members and bucking windings corresponding to additional members 150, 152 and bucking windings 160, 162.

It is to be understood that the crosstalk compensating means shown in FIG. 6 and described in connection therewith may be incorporated in either the first preferred embodiment hereinabove described or the second preferred embodiment hereinabove described. The combination of the first preferred embodiment hereinabove described and the crosstalk compensating means of FIG. 6 is regarded herein as a third preferred embodiment of the present invention, and the combination of the second preferred embodiment hereinabove described with the crosstalk compensating means of FIG. 6 is regarded herein as a fourth preferred embodiment of the present invention.

It will thus be seen that the objects set forth above, among those made apparent from the preceeding description, are efficiently attained, and since certain changes may be made in the above constructions and the method carried out thereby without departing from the scope of the present invention it is intended that all matter contained in the above description or shown in the accompanying drawing shall be interpreted as illustrative only, and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A magnetic transducing head, comprising:
 a first plurality of closely juxtaposed ferromagnetic laminations;
 a second plurality of closely juxtaposed ferromagnetic laminations;
 a first edge portion of each lamination of said first plurality defining together with a first edge portion of a corresponding lamination of said second plurality one of a plurality of closely juxtaposed transducing gaps;
 each of said laminations having a second edge portion lying adjacent a common cylindrical surface;
 low reluctance bridging means;
 non-magnetic rotor means for repeatedly carrying said low reluctance bridging means past equispaced perimetric positions defined by the successive pairs of said second edge portions when rotated, with the rotor axis and the axis of the common cylindrical surface being coincident so as to maintain a fixed gap between the rotor and said laminations;

exciting winding means for producing flux in said bridging means and their associated laminations; and a pair of auxiliary bridging means angularly disposed on opposite sides of each of said low reluctance bridging means for bridging the gaps between the second edge portions of the pairs of laminations lying immediately adjacent the pair of laminations bridged by said low reluctance bridging means and crosstalk compensating windings cooperating with said auxiliary bridging means so as to buck the effect of crosstalk in said transducer head.

2. A magnetic transducing had as claimed in claim 1, further in which said crosstalk compensating windings surround said auxiliary bridging means.

3. A magnetic transducing head as claimed in claim 1, in which said exciting winding means surround said low reluctance bridging means.

4. A magnetic transducing head as claimed in claim 2 in which said exciting winding means surround said low reluctance bridging means.

5. A magnetic transducing head as claimed in claim 4 in which said crosstalk bucking winding means are connected to the exciting winding means surrounding the adjacent low reluctance bridging means to derive exciting voltage therefrom.

* * * * *